UNITED STATES PATENT OFFICE 2,428,108

POLYAMIDE COLOR FORMERS

David Malcolm McQueen, Wilmington, Del., assignor to E. I. du Pont de Nemours & Company, Wilmington, Del., a corporation of Delaware No Drawing. Original application March 31, 1944, Serial No. 528,944. Divided and this application February 24, 1945, Serial No. 579,693

7 Claims. (Cl. 260—310)

This invention relates to hydrophilic dye intermediate polymers. More particularly, it relates to novel hydrophilic polyamides containing a plurality of solubilizing groups and dye intermediate nuclei.

This application is a division of application Serial No. 528,944, filed March 31, 1944, which has been issued as Patent No. 2,423,460, July 8, 1947.

An object of this invention is to provide new color-yielding compositions comprising hydrophilic polymers having dye intermediate nuclei. A further object is to provide hydrophilic dye intermediates which may be used as binding agents for silver halides. Still other objects will be apparent from the following description of the invention.

The present invention involves the preparation and use of hydrophilic polyamide dye intermediates which are synthetic linear polyamides containing a plurality of solubilizing groups and a plurality of dye intermediate or color-forming nuclei. The polyamides contain a plurality of intralinear polyamide linkages and a plurality of ether, hydroxyl, or salt-forming groups as an integral part of the polymers and a plurality of dye intermediate or color-forming nuclei. The polyamides are hydrophilic because of the presence of such groups but their properties can be modified by the incorporation of solubilizing groups into the dye intermediate nuclei or by the incorporation of insolubilizing groups or radicals into the polymer molecule.

The solubilizing groups may be present as intralinear groups or atoms, e. g., intralinear ether (—O—) or amino (—NR—) groups or as lateral or side chain substituents, e. g., hydroxyl groups, ether groups —OR, and amino groups

wherein R is a hydrocarbon radical, e. g., methyl, ethyl, etc., or a hydrocarbon radical containing salt-forming groups, e. g., —COOH, SO₃H, etc. These new polyamides form homogeneous unsupported films which are hydrophilic and permeable to aqueous photographic developer, fixing, bleaching, etc., solutions. The layers, moreover, are substantially colorless and transparent. The term "hydrophilic" as used in this application and claims, when referring to the dye intermediates, etc., is intended to denote compounds which in the form of thin layers, e. g., one to ten microns in thickness, are insoluble in water at 20° C. but are freely water-permeable.

The compounds may be prepared by introducing dye intermediate or color-former nuclei into the polyamide molecule. This may be accomplished by condensing a dye intermediate with a suitable synthetic linear polyamide directly or by means of a bifunctional condensation agent, e. g., formaldehyde, formaldehyde-yielding compounds, etc.

By dye intermediate or color-former nuclei are meant nuclei containing groups which are capable of coupling with a diazo compound to form an azo dye. Such nuclei are usually also capable of coupling with the oxidation products of a color coupling aromatic primary amino developing agent formed on the development of silver salt images to form a quinoneimine (including indamine, indoaniline and indophenol) dye or an azomethine dye.

Nuclei of the above type are well known in the dye art and color photography art. They are sometimes called color-former components, dye-coupling components, etc.

These dye intermediate nuclei have as the active coupling groups a structure which may be represented as

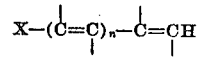

where X is HO— or RNH, where R is hydrogen or a saturated aliphatic group, e. g., methyl, ethyl, beta-hydroxyethyl, beta-chloroethyl, benzyl, dodecyl, etc., and $n$ is 0 or 1. This group is found in the reactive methylene dye intermediates and in aromatic hydroxyl and amino compounds and includes the reactive ethenol, aminoethenyl, 4-hydroxy- and 4-amino-1,3-butadienyl groups. These groups occur in phenols, naphthols, anilines, naphthylamines, acylacetamides, cyanoacetamides, beta-ketoesters, pyrazolones, homophthalimides, coumarones, indoxyls, thioindoxyls, etc.

The reactive ethenol group represented by

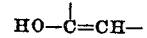

occurs in phenols and naphthols which couple in the ortho position and in the alkali soluble or enol form of most reactive methylene dye intermediates. These reactive methylene groups have a hydrogen rendered mobile by the proximity of certain unsaturated groups such as, for example,

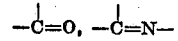

—C≡N and others. The —CH₂— group is usually present between two such groups, for example,

—COCH₂CO—, —COCH₂CN,

—COCH₂C=N— in a cyclic or acyclic system.
The reactive aminoethenyl group, $$RH-N-\overset{|}{C}=CH$$

occurs in aromatic amino compounds which couple in the ortho position.

The 4-hydroxy- and 4-amino-1,3-butadienyl groups represented as $$HO-\overset{|}{C}=\overset{|}{C}-\overset{|}{C}=CH \text{ and } RH-N-\overset{|}{C}=\overset{|}{C}-\overset{|}{C}=CH$$

occur in phenolic, naphtholic and aromatic amino compounds which couple in the para (4) position.

In all of these dye intermediate groups the hydrogen atom in the coupling reactive position may be replaced by groups readily eliminated in the coupling reaction, e. g., halogen, sulfonic acid, carboxylic acid, etc.

The term "synthetic linear polyamide" as used in the present invention refers to the polymeric condensation products containing recurring amide linkages which can be derived from (1) monoamino monocarboxylic acids, (2) diamines with dibasic carboxylic acids, or (3) interpolymers of amino carboxylic acids with diamines and dibasic carboxylic acids. Amide-forming derivatives of these bifunctional reactants may also be employed. General methods for preparing such condensation polymers are described in U. S. Patent 2,071,250. The polyamides suitable for this invention should contain at least one amide group to every 22 atoms of the polymer chain, and preferably at least 1 solubilizing group for every 40 atoms of the polymer chain. The polyamides, moreover, are highly polymeric and should have a unit length of at least 20 where "unit length" is defined as in U. S. Patents 2,071,253 and 2,130,948.

The preferred polyamides for use in preparing the hydrophilic dye intermediates of this invention have an intrinsic viscosity of above 0.4 where intrinsic viscosity is defined as $$\frac{\log_e Nr}{C}$$

wherein Nr is the viscosity of a dilute, metacresol solution divided by the viscosity of metacresol in the same units and at the same temperature, and C is the concentration in grams of polyamide per 100 units of solution. They have a high softening point when dry. The preferred hydrophilic color-forming polyamides are soluble to the extent of at least 5 parts of boiling water or a boiling mixture of water containing less than 50% of a water-miscible solvent and preferably less than 25% of ethanol.

To secure this degree of solubility, it is necessary to choose the polyamides used for preparing the hydrophilic film-forming polyamides from among those products which possess the requisite solubility in aqueous solutions or to introduce solubilizing groups into products of insufficient solubility. Polyamides of the requisite solubility which contain a plurality of intralinear hetero atoms such as oxygen and amino nitrogen atoms are described in U. S. Patents 2,158,064 and 2,191,556. Other useful polyamides of the proper solubility containing several solubilizing components are described in U. S. Patents 2,285,009 and 2,320,088. A fairly wide range in the degree of solubility in aqueous solvents is provided by the use of the products of such patents as intermediate materials.

Still other useful hydrophilic polyamides which contain hydroxyl groups, carboxymethoxy (—OCH₂COOH), methoxy, ethoxy, methoxyethoxy, etc., and salt-forming groups can be used. Such polyamides can be prepared by reacting a less water soluble polyamide with formaldehyde or with formaldehyde in the presence of an alcohol, e. g., ethyl, methoxyethyl, methyl, benzyl, and esters of glycolic acid, e. g., methyl glycolate, ethyl glycolate, etc. Alkaline hydrolysis of these last mentioned hydroxy ester-containing polyamides yields the desirable class of soluble polyamide-containing carboxymethoxy groups.

The introduction of dye intermediate or color-former nuclei into the polyamides will be further described in the following exemplary procedure. A polyamide soluble in water or water-alcohol mixtures, e. g., the condensation polymer obtained from (1) tri-glycoldiamine and sebacic acid, (2) bis-amiopropoxyethane and adipic acid, (3) hexamethylenediamine and diglycolic acid, (4) diaminodipropyl ether and adipic acid, (5) hexamethylenediamine and adipic acid further reacted with formaldehyde and methanol to contain methoxymethyl groups on about 10 to 20% of the amide groups, (6) hexamethylenediamine and N-methyliminodiacetic acid, (7) hexamethylenediamine and N,N'-piperazine diacetic acid, (8) hexamethylenediamine and adipic acid further reacted with formaldehyde and methyl glycolate to contain methoxycarboxymethoxymethyl groups on about 10 to 20% of the amide groups, is condensed in acidic medium, e. g., formic acid, with formaldehyde or formaldehyde generating compounds, e. g., paraformaldehyde, to form the methylol polyamide which is further condensed with a dye intermediate reactive with formaldehyde, e. g., a phenolic, naphtholic, or aromatic amino compound, including those containing a hydroxyl or amide group on a side chain, or an active methylene coupling component such as phenylmethylpyrazolone, acetoacetanilide, thioindoxyl, N-homophthalylamines, etc. Alternatively, the formaldehyde-reacting material may first be condensed with the dye intermediate to form the methylol derivative, e. g., o-methylolphenol, methylol phenylmethylpyrazolone, etc., which may itself be condensed with the polyamide in acidic solution.

The dye intermediate substituted hydrophilic polyamides prepared in the above way contain dye intermediate substituted amide groups as a part of the polymer chain. These substituted amide groups have the structure $$-\text{CO}\overset{|}{\text{N}}-\text{CH}_2-\text{A}-\text{Q}$$

wherein A may be a single bond or an amino, amide, sulfonamide, sulfide or ether oxygen, etc., and Q is a color former nucleus or radical.

The hydrophilic polyamide dye intermediates above described possess a number of useful properties among which may be mentioned (1) ability to form a strong coherent, unsupported film, (2) ready permeability to water and photographic processing solutions at temperatures in the neighborhood of 20° C., (3) insolubility and freedom from softening in water at moderate temperatures, (4) transparency and freedom from color, (5) adequate solubility in satisfactory solvents for coating, (6) freedom from adverse action on sensitive silver salts, (7) a relatively high softening point, and (8) ability to disperse, prevent coagulation and sedimentation of silver salts.

The following examples, in which parts are by weight, all temperatures centigrade, and all solutions aqueous unless otherwise stated, are illustrative of the nature of the invention and not intended to limit it in any way.

*Example I*

A mixture of 20 parts of diaminodipropyl ether/adipic acid polyamide prepared by heating an equimolar mixture of diaminodipropyl ether and adipic acid at 220° for two hours and 50 parts of formic acid is stirred at 65° until a solution is obtained; then ten parts of saligenin is added and stirring at 65° continued for one-half hour. Five hundred parts of acetone is added to precipitate the hydrophilic dye intermediate. The solid is removed by filtration, extracted with acetone, and dried to give 26 parts of a white powder containing approximately one o-hydroxy-benzyl group for each six amide groups. It forms a blue-green dye upon color coupling development of silver salts with p-aminodiethyl aniline.

*Example II*

A mixture of 50 parts of bis-aminopropoxyethane/adipic acid polyamide prepared by heating together at 200° an equimolar mixture of bis-aminopropoxyethane and adipic acid in 100 parts of formic acid is stirred at 65° until a solution is obtained. Then 25 parts of paraformaldehyde is added and stirring at 65° continued for fifteen minutes, followed by addition of 90 parts of phenylmethylpyrazolone and stirring for thirty minutes, after which 20 parts of butanol is added and stirred for fifteen minutes. The solution is precipitated by adding 1000 parts of acetone. The solid is removed by filtration, extracted with acetone, and dried to give 50 parts of a white powder. This material is the mixed butyloxymethyl/phenylmethylpyrazolonoxymethyl polyamide, namely butoxymethyl/(1 - phenyl - 3 - methyl-5-pyrazolon-4-yl) methylpolyamide, having approximately one color-forming group for each eight amide groups. It yields a bright magenta dye image upon color coupling development of silver salts with p-aminodiethyl aniline. It also yields a brilliant yellow dye upon similar development with phenyl hydrazine.

*Example III*

To a solution at 60° of 20 parts of the triglycoldiamine/adipic acid polyamide in 50 parts of 90% formic acid is added 6 parts of paraformaldehyde and the mixture stirred at 60° for fifteen minutes; then 53 parts of acetoacetanilide is added and stirring at 60° continued for one-half hour. The product is precipitated by addition of 500 parts of acetone, the solid removed by filtration and extracted with acetone and dried to yield 28 parts of a yellowish white powder, having color-forming units of the following probable structure:

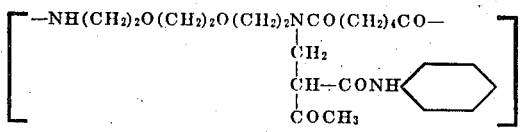

It yields a bright yellow dye image upon color coupling development of silver salt images with p-aminodiethyl aniline.

*Example IV*

A polyamide binding agent is prepared as in Example I by using 15 parts of 2-hydroxy-3-phenylbenzyl alcohol in place of the saligenin, dissolved in 200 parts of 20% ethanol-water. The resulting hydrophilic polyamide has on about 10% of the amide groups, 2-hydroxy-3-phenylbenzyl groups. It yields a blue-green-dye image upon color coupling development of silver salt images with p-aminodiethyl aniline.

*Example V*

A solution of 100 parts of polyhexamethylene adipamide (intrinsic viscosity 1.0) in 400 parts of 90% formic acid is stirred at 60°. To this is added 30 parts of paraformaldehyde and the mixture is stirred at 60° for ten minutes, then 60 parts of 1-N-hydroxethylaminonapthalene-6-sulfonic acid and 25 parts of methyl/hydroxyacetate are added and the mixture stirred for one-half hour at 60°, then poured with stirring into 2000 parts of acetone and 1000 parts of water. The liquid is decanted and 1000 parts of 50% acetone water added and made alkaline by addition of ammonium hydroxide. After washing with 4 charges of 1000 parts each of 40% acetone, the produce is dried. It yields a brilliant magenta dye upon color coupling development of exposed silver salts by means of p-aminodiethyl aniline.

*Example VI*

A solution of 30 parts of polyhexamethylene adipamide (intrinsic viscosity 1.0) in 400 parts of 90% formic acid is heated to 50° with stirring. To this solution is added 10 parts of paraformaldehyde and the mixture is stirred at 55° for 15 minutes, and then 20 parts of methyl glycolate and 30 parts of 4-chloro-1-naphthol are added and the mixture is stirred for one-half hour at 60°. At the end of this time the reaction mixture is poured with stirring into 800 parts of acetone. The liquid is decanted and the precipitate is washed with three changes of 500 parts each of acetone, the total wash time being 6 hours. The product is then filtered and dried to give a light-colored powdery polyamide containing 4-chloro-1-hydroxy-2-naphthyl groups and carbomethoxymethoxy groups attached through methylene groups to the amide nitrogens of the polyamide chain.

Ten parts of this color-forming polyamide is dissolved in 40 parts of 60% ethanol/water at 60° and 10% of sodium hydroxide is added until the solution after stirring for 5 minutes has a pH of 9. Under these conditions, the glycolic ester groups are hydrolyzed and the polymer contains carboxymethoxymethyl sodium salt groups (NaOCOCH₂OCH₂—). The reaction mixture may be diluted with water without precipitation of the hydrolysis product. The hydrophilic color former yields a strong blue-green negative dye upon color coupling development of exposed silver salts by means of p-aminodiethyl aniline.

In place of any of the hydrophilic polyamide dye intermediates employed in the above examples, there may be employed other color-coupling polyamides, providing they have the previously described physical properties. In general, it has been found that ether oxygen atoms in the chain and on a side group are highly desirable in securing the proper degree of solubility and permeability. Hence, the preferred class of polymers employed in this invention desirably contain at least one ether oxygen atom for every 40 chain atoms or between 1 and 10 ether oxygen atoms for each 10 amide groups. The following compounds containing ether groups are among those valuable in preparing the polyamides of the present invention:

$$NH_2(CH_2)_xO(CH_2)_xNH_2$$
$$NH_2(CH_2)_xO(CH_2)_xO(CH_2)_xNH_2$$

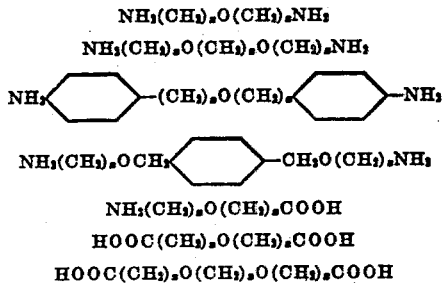

$$NH_2(CH_2)_xO(CH_2)_xCOOH$$
$$HOOC(CH_2)_xO(CH_2)_xCOOH$$
$$HOOC(CH_2)_xO(CH_2)_xO(CH_2)_xCOOH$$

In these compounds $x$ is 1, 2, 3, or 4 and one or more of the hydrogen atoms on carbon atoms may be replaced by methyl, ethyl, etc. In addition, aliphatic diamines, dibasic acids, or aminoacids having small alkoxy groups, e. g., methoxy, ethoxy, propoxy, are useful in preparing these water-sensitive polyamides.

Another useful class of intermediates for preparing water-sensitive polyamides are those containing intralinear tertiary nitrogen groups such as the following:

$$HOOC(CH_2)_xNR(CH_2)_xCOOH$$

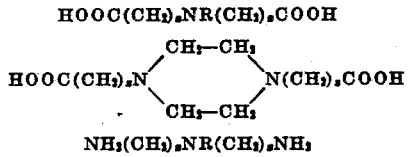

$$NH_2(CH_2)_xNR(CH_2)_xNH_2$$

In these compounds R is a small alkly group, e. g., methyl, ethyl propyl, and $x$ is 2, 3, or 4.

In cases where the polyamide chain contains no water solubilizing group (ether or terytiary-amino group) or an insufficient number to cause a satisfactory solubility and permeability, the introduction of such groups by reaction with formaldehyde and active hydrogen compounds such as alcohols, amides, ureas, etc., is possible. Suitable alcohols include methyl, ethyl, propyl, beta-methoxy-ureas, ethyl, etc.

A high water solubility of the original polymer does not prevent its use in the preparation of the color-formers of the present invention, since the introduction of dye intermediate nuclei may decrease the cold water solubility to a point where the coated films are no longer softened excessively in water. If the hydrophilic color former does not have sufficiently high water sensitivity or solubility, this can be improved by the introduction of solubilizing groups. For example, the carboxylic or sulfonic acid group can be introduced by reaction with formaldehyde and an ester of a hydroxy acid, followed by hydrolysis, or by the use of a dye intermediate nucleus containing such solubilizing groups. Any of these solubilizing groups can be introduced either before or after introduction of the color-forming groups into the polymer.

In the method of preparing these polyamide color-forming binding agents employing formaldehyde to connect the color formers to the polyamide, the formaldehyde may be in any form. Thus, it can be used as solid paraformaldehyde, or dissolved or suspended in water or solvents for the polyamide, or as formaldehyde releasing compounds such as trioxane, hexamethylenetetramine, etc.

In addition to the color-forming groups of the above examples, many of the other well-known coupling component groups may be employed. Thus, the dye intermediate nucleus may be any aromatic, phenolic, or amino compound having a coupling position available ortho or para to the activating group, or any active methylene compound, i. e., a compound having a —CH₂— group activated by two unsaturated groups taken from the class of

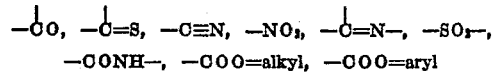

connected either directly or through a conjugated system. Such active methylene compounds are distinguished by their ability to enolize in alkaline solution forming a soluble alkali metal salt and include many acyclic and heterocyclic compounds known in the art. Examples of such active acyclic and intracyclic methylene compounds include (1) beta-keto-acyl amides of the type RCOCH₂CONHR', where R is a hydrocarbon or heterocyclic radical and R' is preferably aromatic, e. g., benzoylacetanilide, p-nitrobenzoylacetanilide, p-nitroacetanilide, naphthoyl-acetanilide, p-acetoacetaminobenzoic acid, furoylacetanilide; (2) pyrazolones, e. g., 1-phenyl-3 - methyl - 5 - pyrazolone, 1-p-chlorophenyl- 3 - methyl - 5 - pyrazolone, 1 - phenyl-3-carboxy-5-pyrazolone, 1-m-sulfophenyl-3-methyl-5-pyrazolone; (3) indoxyl and thioindoxyl; (4) N-homophthalylamines, e. g., N-homophthalylaniline, N-homophthalyl-n-dodecylamine, N-homophthalyl-beta-naphthylamine; (5) 2,4-dihydroxyquinoline; (6) p-nitrobenzylcyanide; (7) diketohydrindene; (8) malonamides, e. g., ethyl-N-phenylmalonamate, N-N'-diphenylmalonamide; (9) phenacylpyridinium bromide; (10) hydroxypyridine; (11) cyanoacetanilide, cyanoacetic ethyl ester.

The color yielding elements of this invention are not limited in their utility to any one process of color photography. They may be used with other color coupling developing agents than those specifically described in the examples. The diamino aryl compounds such as para-phenylenediamine and its substitution products are preferred. These developers may be substituted in one amino group as well as in the ring, preferably the former, to constitute compounds such as the mono- and di-alkyl arylenediamines, including the mono- and di-alkyl naphthylenediamines, alkyl phenylenediamines and alkyl toluylenediamines. The compounds, of course, must have one free primary or unsubstituted amino group which enables the oxidation product of the developer to couple with the color-forming compounds. As examples of developers of the class described, there may be mentioned p - amino - diethyl - aniline, 1,4-naphthylenediamine, 4-diethylamine-1-naphthyl-amine. The salts of the bases which may be organic or inorganic are, in general, more soluble and more stable than the free bases. The hydrochlorides and sulfates have great utility in preparing the developing solutions.

The hydrophilic polyamide dye intermediates hereof are also useful as adjacent layers in operative contact with non-color-forming layers containing silver salts.

These new hydrophilic dye intermediate derivatives of polyamides are also useful in many other dyeing operations. They may be incorporated in polymers or solutions of polymers used for spinning fibers or casting films, e. g., cellulose and its derivatives, nylons, polyesters, vinyl polymers, etc. Materials or articles containing the dye intermediate of Examples II or III when treated with diazotized p-nitroaniline-o-sulfonic acid is converted to a bright yellow color and the polymeric dye, being an integral part of the materials or articles, is fast to washing and dry cleaning even when repeated many times and under drastic conditions. Similarly when the dye intermediate of Example V is reacted with diazotized p-nitroaniline-o-sulfonic acid a blue dye is formed which is equally resistant to washing or dry cleaning. By the use of the new hydrophilic dye intermediates prepared according to this invention but using dye-forming reagents containing other dye intermediate nuclei a wide range of dyes may be formed. Alternatively the polymers may be converted to dyes by treatment with diazotized amines and the polymeric dyes incorporated in the fiber or film-forming polymer. Dyed articles prepared in this way exhibit the same high degree of wash fastness.

The new hydrophilic polyamide color formers are also useful in other colloid silver halide emulsion layers. Thus they may be dissolved in water or aqueous solutions of water-miscible solvents and incorporated in gelatin-silver halide emulsions. The new color-formers being themselves binding agents and highly polymeric do not under these conditions wash out of or migrate in the gelatin, etc., emulsions.

What is claimed is:

1. A hydrophilic synthetic linear polyamide dye intermediate having a plurality of extralinear dye intermediate nuclei attached to an amido nitrogen atom of the polyamide chain of atoms through an unsubstituted methylene radical, the intralinear amide groups of said chain being separated by at least two carbon atoms, said nuclei possessing a structure of the formula:

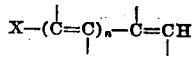

where X is a member of the group consisting of HO—, primary and secondary amino radicals and n is a number from the group consisting of 0 and 1.

2. A hydrophilic synthetic linear polyamide dye intermediate having a plurality of extralinear dye intermediate nuclei attached to an amido nitrogen atom of the polyamide chain of atoms through an unsubstituted methylene radical, the intralinear amide groups of said chain being separated by at least two carbon atoms, said nuclei possessing a structure of the formula:

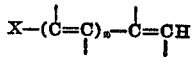

where X is a member of the group consisting of HO—, primary and secondary amino radicals and n is a number from the group consisting of 0 and 1, which is soluble to the extent of at least 5% by weight in a boiling aqueous solution containing less than 50% of ethanol.

3. A hydrophilic synthetic linear polyamide color former having the intralinear amide groups in the polyamide chain of atoms being separated by at least two carbon atoms, and having a plurality of extralinear color former nuclei each of which are attached to an intralinear amido nitrogen atom by a radical of the formula —CH₂—A, wherein A is a linkage taken from the group consisting of a single bond, amino, amido, sulfonamido, and ether oxygen and is attached to the color former nuclei.

4. A hydrophilic synthetic linear polyamide color former containing a plurality of color-former-substituted intralinear amide groups of the formula

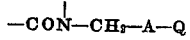

where Q is a color former nuclei, and A is a linkage selected from the group consisting of a single bond, amino, amido, sulfonamido and ether oxygen, said intralinear amide groups being separated by a chain of at least two carbon atoms.

5. A hydrophilic synthetic linear polyamide color-former containing a plurality of color-former-substituted intralinear amide groups of the formula

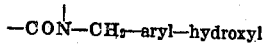

said intralinear amide groups being separated by a chain of at least two carbon atoms.

6. A hydrophilic synthetic linear polyamide color former containing a plurality of color-former-substituted intralinear amide groups of the formula —CON—CH₂— pyrazolone, said intralinear amide groups being separated by a chain of at least two carbon atoms.

7. A hydrophilic synthetic linear polyamide color former containing a plurality of color former units of the structure

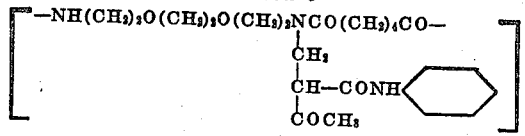

DAVID MALCOLM McQUEEN.

REFERENCES CITED

The following references are of record in the file of this patent:

UNITED STATES PATENTS

| Number | Name | Date |
|---|---|---|
| 2,307,399 | Frohlich et al. | Jan. 5, 1943 |
| 2,179,234 | Schneider | Nov. 7, 1939 |

Certificate of Correction

Patent No. 2,428,108.  September 30, 1947.

DAVID MALCOLM McQUEEN

It is hereby certified that errors appear in the printed specification of the above numbered patent requiring correction as follows: Column 2, line 42, for the word "coumarones" read *coumaronones*; column 7, line 41, for "terytiary" read *tertiary*; and that the said Letters Patent should be read with these corrections therein that the same may conform to the record of the case in the Patent Office.

Signed and sealed this 2nd day of March, A. D. 1948.

[SEAL]

THOMAS F. MURPHY,
*Assistant Commissioner of Patents.*